April 12, 1955 A. STETTNER 2,705,848
FISH LURE
Filed June 15, 1950
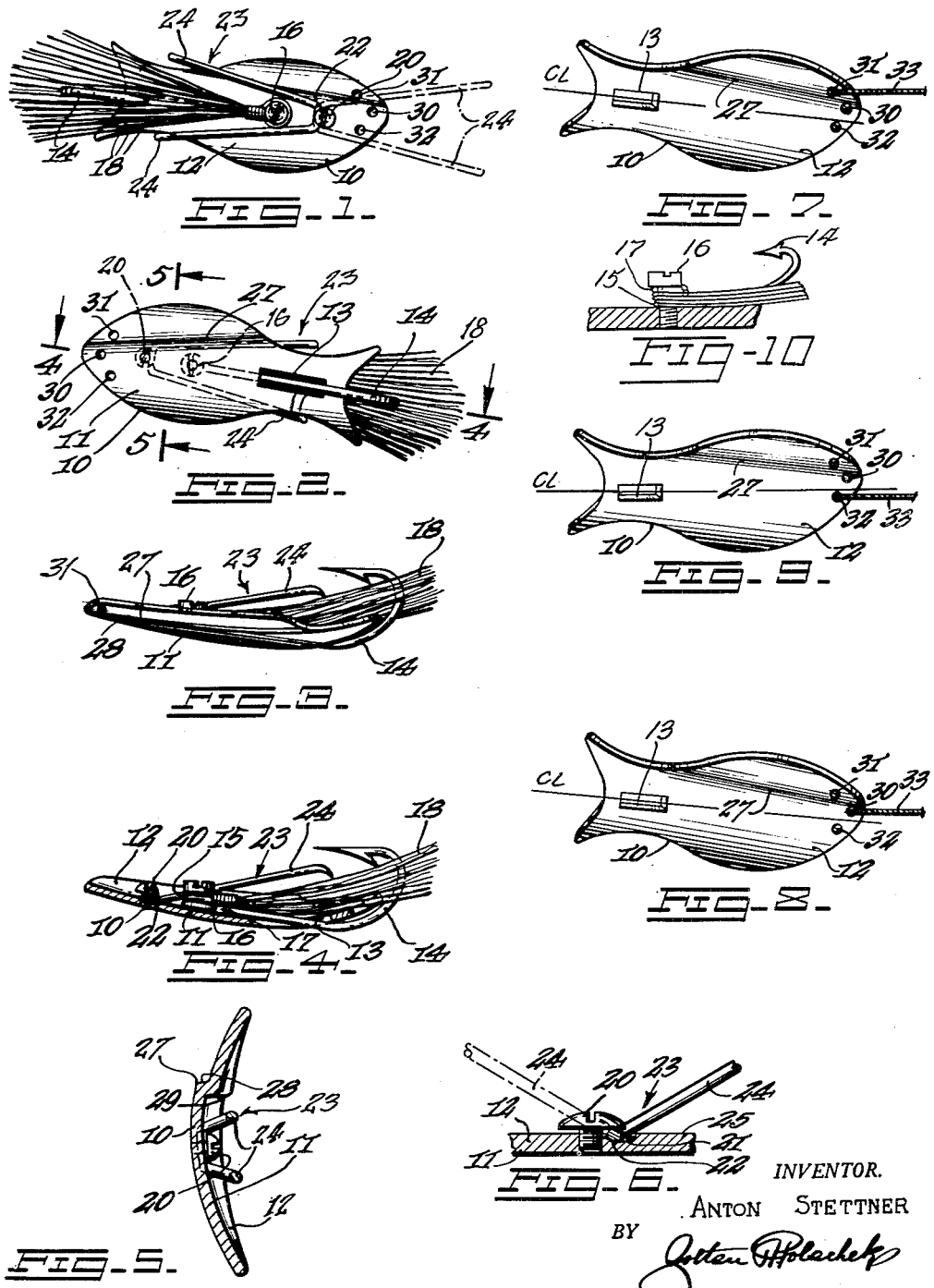
INVENTOR.
ANTON STETTNER
BY
*Jotten Holacek*
ATTORNEY.

United States Patent Office 2,705,848
Patented Apr. 12, 1955

2,705,848

FISH LURE

Anton Stettner, Corpus Christi, Tex.

Application June 15, 1950, Serial No. 168,279

1 Claim. (Cl. 43—42.4)

This invention relates to a new and improved fishing lure and has for its principal object the provision of an adjustable multi-purpose lure of the spoon type.

Another object of the invention is to construct the lure of the invention so that the same is readily adjustable to ride in the water at a variety of depths in a variety of angular positions and with a variety of swimming motions.

A further object of the invention is to construct and arrange the lure of the invention so that the same is capable of being manufactured economically.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a top plan view of the lure of the invention looking at the concave side of the spoon portion thereof.

Fig. 2 is a bottom plan view of the lure looking at the convex side of the spoon portion.

Fig. 3 is a side elevational view of the lure.

Fig. 4 is a sectional view on line 4—4 of Fig. 2.

Fig. 5 is an enlarged sectional view on line 5—5 of Fig. 2.

Fig. 6 is an enlargement of a portion of Fig. 4.

Fig. 7 is a diagrammatic view illustrating one operating position of the lure.

Fig. 8 is a diagrammatic view illustrating a second operating position of the lure.

Fig. 9 is a diagrammatic view illustrating a third operating position of the lure.

Fig. 10 is a view similar to Fig. 6 showing a different portion of Fig. 4.

The fishing lure, according to the present invention, includes a spoon 10 of metal or similar material in the general form of a small fish and having a convex side 11 and a concave side 12 as shown. Near the tail of the spoon which it will be noted curves upward in the direction of the concave side, there is provided a longitudinal slot 13 through which extends the stem of a fish hook 14, said hook being secured to the concave side of the spoon, passing through said slot to the convex side and having the hook portion thereof curved about the tail of the spoon. At one end of the stem of the hook 14 there is a loop 15 which encompasses the shank of a headed screw 16 threaded into the concave side of the spoon. Also secured on the screw 16 is a loop 17 to which is secured a so-called feather which in the present instance consists of a tuft 18 of colored hair.

Forward of the screw 16 a second headed screw 20 is threaded into the concave side of the spoon 10, the head of said screw 20 overlapping a lateral groove 21 in the same side of the spoon, see also Figs. 4 and 6. Pivotally mounted in the groove 21, beneath the head of said screw, is the cross portion 22 of a substantially V-shaped wire weed guard 23 having rearwardly extended arms 24. The arms 24 in their operative position lie against the surface of the concave side of the spoon on both sides of the slot 13 and in their inactive position lie against the front end of the spoon, see Fig. 1. In Fig. 1 the operative or guarding position of the arms 24 is shown in full lines and the inactive position in dot and dash lines. In the operative position the arms protect the hook 14 from becoming entangled in underwater weeds, and preferably the ends of said arms are turned in, see Figs. 3 and 4, to prevent their becoming entangled.

According to the invention the side to side convex and concave curved body of the spoon is offset toward one side of its longitudinal center line along a line 27, see Figs. 2 and 3, which offset extends from a point at one side of the midpoint of the head portion of the spoon, rearwardly and laterally, terminating at the edge of the spoon a short distance forward of the tail portion of the spoon and about coincident with the beginning of the upward curve of the tail. Thus, as best shown in Fig. 5, an outer shelf 28 is formed on the convex side of the spoon and an inner shelf 29 is formed on the concave side thereof.

Three holes 30, 31 and 32 are provided in the head portion of the spoon, the first on about the longitudinal center line of the spoon and just to one side of the line 27, the second to one side of said center line and the third to the other side of said center line. The holes 30, 31 and 32 are adapted to be engaged one at a time by a fishing line 33 to provide a variety of results as shown diagrammatically in Figs. 7, 8 and 9.

Referring first to Fig. 7, which is a view looking at the concave surface of the spoon, it will be seen that the fish line 33 is secured to the spoon by means of the hole 31. With this connection, pulling on the line 33 draws the lure through the water in the angular position shown, with the front end or head portion of the spoon tilted downward. The inclination of the offset portion defined by the shelves 28, 29, causes the lure to swim through the water very close to the surface; and the upward curvature of the tail of the spoon causes the lure to wobble up and down in its forward travel.

When the line 33 is connected by means of the center hole 30, the offset 28, 29 still is moved through the water in an angular position, the angle of which, is however, as shown in Fig. 8, is not so great as when the hole 31 is utilized. Also the same side of the spoon is tilted downward. The result is that the lure will travel through the water at a depth some several inches below the surface.

When the hole 32 is utilized for the line 33 the offset shelves 28, 29 are aligned with the path of travel of the lure is as shown in Fig. 9. The spoon moves through the water in a level condition, that is, neither end is tilted up. The result of the aligning of the offset shelves 28 and 29 with the path of travel of the lure is that the spoon acts somewhat as a sinker, not as a lifter, as in Figs. 7 and 8, and the lure travels through the water at a considerable depth.

It will be seen, therefore, that the lure of the invention is adjustable to adapt itself to a variety of uses.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In a fish lure of the spoon type having a fish-shaped head portion and a tail portion, said tail portion having an elongated slot therein to receive a fish-hook therethrough, tail feathers on said spoon, and a U-shaped wire weed guard pivotally mounted on said spoon and having the arms thereof on opposite sides of said tail feathers in one position and swingable therefrom on the spoon to an inoperative position, said spoon having a convex and concave curvature and an offset formed to one side of its longitudinal center to define a shelf on the concave side and a shelf on the convex side, said offset extending substantially longitudinally for the length of the spoon from a point at one side of the midpoint of the head portion to one edge of the spoon near the tail end, said head portion having an aperture therein located at one side of the offset and two spaced apertures at the other side of said offset.

References Cited in the file of this patent

UNITED STATES PATENTS

| | | |
|---|---|---|
| 813,500 | Kausch | Feb. 27, 1906 |
| 1,435,177 | Peckinpaugh | Nov. 14, 1922 |
| 1,806,088 | Schnell | May 19, 1931 |
| 1,986,282 | Parker | Jan. 1, 1935 |
| 1,992,766 | Pflueger | Feb. 26, 1935 |
| 2,145,283 | Accetta | Jan. 31, 1939 |
| 2,180,918 | Verzi | Nov. 21, 1939 |
| 2,206,486 | Nelson | July 2, 1940 |
| 2,294,081 | Fairfax | Aug. 25, 1942 |
| 2,295,375 | Adam | Sept. 8, 1942 |
| 2,319,686 | Janisch | May 18, 1943 |
| 2,569,792 | Wilson | Oct. 2, 1951 |

FOREIGN PATENTS

| | | |
|---|---|---|
| 598,343 | Germany | June 11, 1934 |